US006687110B2

(12) United States Patent
Murray

(10) Patent No.: US 6,687,110 B2
(45) Date of Patent: Feb. 3, 2004

(54) ISOLATING CIRCUIT BREAKER AND CIRCUIT PROTECTION ARRANGEMENT

(75) Inventor: David R Murray, Wynnum (AU)

(73) Assignee: Nu-Lec Industries Pty Limited (AU)

( * ) Notice: Subject to any disclaimer, the term of this patent is extended or adjusted under 35 U.S.C. 154(b) by 218 days.

(21) Appl. No.: 09/980,470

(22) PCT Filed: Apr. 3, 2001

(86) PCT No.: PCT/AU01/00370

§ 371 (c)(1),
(2), (4) Date: Dec. 3, 2001

(87) PCT Pub. No.: WO01/78100

PCT Pub. Date: Oct. 18, 2001

(65) Prior Publication Data

US 2002/0135964 A1 Sep. 26, 2002

(30) Foreign Application Priority Data

Apr. 5, 2000 (AU) .............................................. PQ6723

(51) Int. Cl.$^{7}$ .................................................. H02H 1/00

(52) U.S. Cl. ......................... 361/131; 361/64; 337/142; 337/172; 337/171

(58) Field of Search ................................ 337/168, 194, 337/165, 171, 176, 178, 206, 240, 275; 361/131, 64, 115

(56) References Cited

U.S. PATENT DOCUMENTS

| | | | | |
|---|---|---|---|---|
| 3,793,494 A | * | 2/1974 | Cleaveland | 200/50.22 |
| 4,596,911 A | | 6/1986 | Guery et al. | |
| 4,725,911 A | | 2/1988 | Dieppedalle et al. | |
| 4,935,715 A | * | 6/1990 | Popeck | 337/169 |
| 5,477,201 A | | 12/1995 | Garnto et al. | |
| 5,502,426 A | | 3/1996 | Blanchard et al. | |
| 5,546,062 A | | 8/1996 | Duchemin | |
| 5,612,661 A | * | 3/1997 | Twenter et al. | 337/169 |
| 5,828,277 A | | 10/1998 | Duchemin | |
| 5,859,398 A | | 1/1999 | McKean | |

FOREIGN PATENT DOCUMENTS

| | | | | |
|---|---|---|---|---|
| AU | 667953 | | 3/1994 | |
| AU | 683191 | | 5/1996 | |
| DE | 34 12 399 | | 10/1985 | |
| GB | 1 530 576 | | 11/1978 | |
| JP | 406333468 A | * | 5/1993 | H01H/33/42 |
| JP | 08-096690 | | 4/1996 | |
| JP | 09-219137 | | 8/1997 | |
| WO | WO 94/07254 | | 3/1994 | |
| WO | WO 00/08664 | | 2/2000 | |
| WO | WO 00/46896 | | 8/2000 | |

* cited by examiner

*Primary Examiner*—Gregory J. Toatley, Jr.
*Assistant Examiner*—Boris Benenson
(74) *Attorney, Agent, or Firm*—Parkhurst & Wendel, L.L.P.

(57) ABSTRACT

An isolating circuit breaker (40) for pole mounting (12) in relation to a electrical distribution line, said isolating circuit breaker including: an isolating switch (50) with a pivoting link (52), said isolating switch having respective terminals (45, 44) for electrical coupling to load and supply conductors (54, 53) of the electrical distribution line; a circuit interrupter (55) disposed in series with the isolating switch (50), intermediate said load and supply conductors and preferably incorporated in the pivoting link of the isolating switch; an actuator (58) arranged for selectively opening and closing the circuit interrupter (55); an electronic controller (61) controlling operation of the isolating circuit breaker in response to electrical conditions in the distribution line; and said isolating switch, circuit interrupter, actuator and electronic controller arranged together on a mounting structure (41, 42, 43) adapted for pole mounting. A circuit protection arrangement comprising a plurality of isolating circuit breakers and an associated protection method are also described.

33 Claims, 7 Drawing Sheets

ISOLATING CIRCUIT BREAKER AND CIRCUIT PROTECTION ARRANGEMENT

BACKGROUND OF THE INVENTION

1. Field of the Invention

This invention relates generally to electrical switchgear and protection arrangements for electric power distribution networks. More particularly, the invention relates to an improved isolating circuit breaker and a circuit protection system for medium voltage distribution networks utilising a plurality of the improved isolating circuit breakers.

2. Discussion of the Background Art

Existing electrical switchgear includes a dual purpose assembly that may function as both an isolating switch and a fuse, and is generally known in the electric power industry as a "dropout fuse". Examples of a fuse and a dropout fuse holder are disclosed in Australian Patent No. 667953 and Australian Patent No. 683191 (respectively), both in the name of Cooper Power Systems, Inc. Some of the problems and drawbacks of conventional fuses and associated fuse holders are discussed in the introductory paragraphs of the Cooper Power Systems patent specifications.

Electric power utilities generally use dropout fuses in relatively large numbers in medium voltage distribution networks, often in a pole-mounted configuration, for reasons of cost. However, the fuses must be manually replaced by linesmen, which delays restoration of supply subsequent to a fuse blowing. Isolating switches, with or without fuses, are used for operations in conjunction with separate line sectionalising circuit breakers or automatic re-closing type circuit breakers. In the present context, medium voltage includes the range from about 10 kV up to about 75 kV. There have also been previous attempts to combine on-load circuit breakers with isolating switches, as exemplified by U.S. Pat. No. 4,596,911 to Guery et al., wherein a common operating mechanism closes the isolating switch prior to the circuit breaker and vice versa during opening.

More recently, U.S. Pat. No. 5,959,398 to McKean describes a sequential isolating circuit breaker and actuator wherein a vacuum interrupter provides fast interruption of load current and the isolator provides a large visual gap in the open position for safety reasons. The actuator mechanism in the McKean patent is a complex rotary driven arrangement including spring loaded levers and lost motion linkages.

German Patent Application No. 3412399 in the name of Sachsenwerk, Licht & Kraft AG discloses a high voltage switch with a vacuum switching tube incorporated into a rotary arm carrying an isolating contact on the end of the arm. The rotary mounting for the other end of the rotary arm, that is driven by an actuator, has a cam slot and guide pin arrangement for synchronising the opening of the vacuum interrupter contacts with the isolator contacts.

The prior art arrangement of isolating switches and circuit breakers in series with common actuation does not allow for independent operation of the respective contact sets. In particular, this arrangement does not facilitate opening and automatic re-closing of the circuit breaker alone, to reconnect the load in the event of a transient fault on a protected line. Furthermore, the physical designs are generally suited to metal-clad or indoor use, rather than being more compact and suited to pole-mounting.

In distribution networks with three phase circuits it is desirable to detect faults such as a phase-to-phase fault or a phase-to-ground fault, that may compromise distribution network security. Fault detection can be arranged to control operation of circuit breakers associated with the conductors in order to prevent network damage and when endeavouring to clear the fault.

In obtaining measurements from phase conductors, substantial isolation arrangements are required in view of the potential difference which exists between individual phase conductors and the control equipment for circuit breakers. Conventionally control equipment for circuit breakers is mounted in a cabinet at ground potential.

Furthermore, circuit breakers for three-phase applications typically employ a common actuating mechanism for all three phases. This similarly calls for a relatively heavy and cumbersome device, resulting from the isolation requirements and the mechanical performance required to operate three sets on contacts. This also adds to the cost of acquiring and installing circuit breakers.

BRIEF SUMMARY OF THE INVENTION

Object of the Invention

It is an object of the present invention to provide an isolating circuit breaker which ameliorates or overcomes at least some of the problems associated with the prior art.

It is another object of the present invention to provide a compact isolating circuit breaker for pole mounted, medium voltage applications.

It is yet another object of the present invention to provide a self-contained isolating circuit breaker which can be retrofitted to electrical distribution networks in place of conventional dropout fuses and fuse holders.

It is a further object of the invention to provide a circuit protection arrangement including a plurality of isolating circuit breakers that effect coordinated protection of three phase circuits.

Further objects will be evident from the following description.

Disclosure of the Invention

In one form the invention resides in an isolating circuit breaker for pole mounting in relation to a electrical distribution line, said isolating circuit breaker including:

(a) an isolating switch with a pivoting link, said isolating switch having respective terminals for electrical coupling to load and supply conductors of the electrical distribution line;

(b) a circuit interrupter disposed in series with the isolating switch, intermediate said load and supply conductors;

(c) an actuator arranged for selectively opening and closing the circuit interrupter;

(d) an electronic controller controlling operation of the circuit breaker in response to electrical conditions in the distribution line; and (e) said isolating switch, circuit interrupter, actuator and electronic controller arranged together on a mounting structure adapted for pole mounting.

Most preferably, the circuit interrupter is incorporated in the pivoting link of the isolating switch.

In one arrangement of the isolating circuit breaker the electronic controller is incorporated in the mounting structure; whilst in an alternative arrangement the electronic controller is incorporated in the pivoting link of the isolating switch.

The actuator and electronic controller are suitably not isolated from the distribution line so as to float at line potential. If required however, the actuator and electronic controller could be isolated from the distribution line.

Preferably the isolating circuit breaker further includes a sensor arrangement coupled to the electronic controller, the sensor arrangement arranged for producing signals in response to electrical conditions in the distribution line. In preference, the sensor arrangement is carried by the mounting structure. Suitably the sensor arrangement includes a current transformer for measuring current in the distribution line. The sensor arrangement may also include a voltage transformer for measuring voltage in the distribution line. If required, the sensor arrangement includes a resistive voltage divider or a capacitive voltage divider for measuring voltage in the distribution line.

The electronic controller may derive power supply from the distribution line. The electronic controller may derive power supply from a separate transformer or capacitor coupled to the distribution line. In preference, the electronic controller derives power supply from a primary or secondary storage cell.

The electronic controller preferably includes a integrated circuit device, such as a microprocessor, gate array or applications specific integrated circuit, with a memory for storing data. Preferably the data includes protection settings relating to operation of the isolating circuit breaker. Suitably the settings include parameters for an automatic re-closing sequence of the circuit interrupter. If required, the memory may also be arranged to store historical data relating to the electrical conditions in said distribution line.

The circuit interrupter may further include at least one communications transceiver coupled to the electronic controller. Preferably the communications transceiver facilitates communications with other isolating circuit breakers for providing earth current and/or earth fault protection of a multi-phase distribution circuit. If required, the communications transceiver facilitates communications with a remote device for uploading protection settings and/or downloading of historical data.

Preferably, the communications medium utilised by the communications transceiver is radio. If required the communications medium may be optical, suitably utilising optical fibre links. Alternatively, the communications medium may be acoustic, preferably in the ultrasonic range of frequencies.

Suitably, the isolating switch is an air gap isolator. Preferably the circuit interrupter is a vacuum interrupter.

In a second form, the invention resides in an isolating circuit breaker for pole mounting in relation to a electrical distribution line, said isolating circuit breaker including:

(a) a mounting arrangement comprising an insulating housing;

(b) a first line terminal on the housing for connection to a supply conductor of the distribution line;

(c) a first isolating contact electrically coupled to the first line terminal;

(d) a sensor arrangement located in said housing, the sensor arrangement producing signals in response to electrical conditions in the distribution line;

(e) a control module located in said housing, the control module receiving signals from the sensor arrangement for controlling operation of an actuator in response to said signals;

(f) a link pivotally mounted in relation to said housing, the link having a second isolating contact on a free end thereof for engagement with the first isolating contact;

(g) the link incorporating a circuit interrupter selectively opened and closed by the actuator; and (h) wherein said circuit interrupter has a terminal electrically coupled to the second isolating contact and has an opposite terminal electrically coupled to a second line terminal for connection to a load conductor of the distribution line.

Suitably the sensor arrangement is associated with a portion of the electrical coupling between the first line terminal and the first isolating contact, which portion is also located in said housing.

Electronic circuitry for the control module may be disposed in a separate cartridge that is selectively removable from the insulating housing for adjusting the operating parameters and/or downloading data logs.

Preferably, the actuator includes an operating arm protruding from the insulating housing for opening and closing said circuit interrupter.

The actuator may comprise a solenoid mechanically coupled to the operating arm. Most preferably the operating arm is manually operable, suitably by a separate lever which may also functions as a position indicator for the circuit interrupter.

In a third form the invention resides in an isolating circuit breaker for pole mounting in relation to a electrical distribution line, said isolating circuit breaker including:

(a) a mounting arrangement comprising two insulating members carrying respective support arms;

(b) a first line terminal on an upper support arm for connection to a supply conductor of the distribution line;

(c) a first isolating contact on the upper support arm electrically coupled to the first line terminal;

(d) a link pivotally mounted on a lower support arm, the link having a second isolating contact on a free end thereof for engagement with the first isolating contact;

(e) the link incorporating:

(i) a sensor arrangement for producing signals in response to electrical conditions in the distribution line, (ii) a controller receiving signals from the sensor arrangement for controlling operation of an actuator in response to said signals, and (iii) a circuit interrupter selectively opened and closed by the actuator;

(f) wherein said circuit interrupter has a terminal electrically coupled to the second isolating contact and has an opposite terminal electrically coupled to a second line terminal for connection to a load conductor of the distribution line.

Suitably the sensor arrangement is associated with the electrical coupling between the circuit interrupter and the second isolating contact.

The actuator is preferably a magnetic actuator with an axially movable operating member.

The circuit interrupter is suitably a vacuum interrupter having fixed and movable contacts coupled to respective fixed and movable terminals.

Suitably, the fixed terminal of the circuit interrupter is pivotally mounted on the lower support arm and the movable terminal is coupled to the actuator. The circuit interrupter may also be manually operated by an operating lever mechanically coupled to the actuator.

If required the operating lever operates the circuit interrupter during a first arc of travel, and opens the first and second isolating contacts of the isolating switch during a second arc of travel. Desirably, the circuit interrupter is only able to be closed after the first and second isolating contacts of the isolating switch are closed.

In further form, the invention resides in a circuit protection arrangement for a multi-phase circuit of an electrical distribution network, said arrangement comprising:

(a) a plurality of isolating circuit breakers for connection in respective phase lines of the multi-phase circuit, wherein each isolating circuit breaker includes:

(i) an isolating switch with a pivoting link, said isolating switch having respective terminals for electrical coupling to load and supply conductors of a phase line;

(ii) a circuit interrupter disposed in series with the isolating switch, intermediate said load and supply conductors;

(iii) an actuator arranged for selectively opening and closing the circuit interrupter;

(iv) a sensor arrangement producing signals in response to electrical conditions in a respective phase line;

(v) a communications transceiver for transmitting said signals to others of the plurality of isolating circuit breakers and for receiving respective phase line condition signals transmitted by other isolating circuit breakers of said plurality;

(vi) an electronic controller receiving signals from both the sensor arrangement and from the other isolating circuit breakers via the communications transceiver; and (vii) said isolating switch, circuit interrupter, actuator and electronic controller arranged together on a mounting structure adapted for pole mounting;

(b) whereby the electronic controllers process the line condition signals from each phase in substantially real time to control operation of individual actuators of respective circuit interrupters.

Preferably, the communications transceiver uses an electromagnetic communications medium, suitably employing an analogue modulation scheme. The communications medium may comprise radio, or alternatively, the communications medium may comprise optics. In an alternative arrangement, the communications transceiver uses an acoustic communications medium such as ultrasonic band frequencies.

Suitably, the signals produced by the sensor are indicative of the instantaneous value of the current and/or voltage on each phase line. Preferably, the control modules sum the instantaneous values whereby a residual vector sum is indicative of a fault condition in the multi-phase circuit.

In a yet further form the invention resides in a circuit protection arrangement for a multi-phase circuit of an electrical distribution network, said arrangement including:

(a) a plurality of isolating circuit breakers for connection in respective phase lines of the multi-phase circuit, wherein each isolating circuit breaker comprises:

(i) an isolating switch with a pivoting link, said isolating switch having respective terminals for electrical coupling to load and supply conductors of a phase line;

(ii) a circuit interrupter disposed in series with the isolating switch, intermediate said load and supply conductors;

(iii) a sensor arrangement producing signals in response to electrical conditions in a respective phase line;

(iv) an electronic controller receiving signals from the sensor arrangement, (v) an actuator arranged for selectively opening and closing the circuit interrupter in response control signals from the electronic controller; and (vi) said isolating switch, circuit interrupter, actuator and electronic controller arranged together on a mounting structure adapted for pole mounting;

(b) the actuators of respective isolating circuit breakers being mechanically coupled such that all circuit interrupters of said plurality may be opened substantially simultaneously in response to a predetermined fault condition in at least one of said phase lines.

The mechanical coupling may be arranged such that all circuit interrupters are opened simultaneously only as a result of a persistent fault condition, for example at the end of an automatic re-closing sequence. Suitably, the operating mechanisms are mechanically coupled by insulating coupling rods extending between respective actuators.

In a still further form, the invention resides in a method for protecting a multiphase circuit of an electrical distribution network, said network comprising:

(a) a plurality of isolating circuit breakers for connection in respective phase lines of the multi-phase circuit, wherein each isolating circuit breaker includes:

(i) an isolating switch with a pivoting link, said isolating switch having respective terminals for electrical coupling to load and supply conductors of a phase line (ii) a circuit interrupter disposed in series with the isolating switch intermediate said load and supply conductors;

(iii) a sensor arrangement producing signals in response to electrical conditions in the phase line;

(iv) a communications transceiver associated with the sensor arrangement; and (v) the isolating switch, circuit interrupter and sensor arrangement carried by a mounting structure adapted for pole mounting;

(b) wherein the method includes the steps of:

(i) sensing the instantaneous values of an electrical parameter of a phase line at a respective isolating circuit breaker;

(ii) transmitting the instantaneous value signals produced by the sensor arrangement to others of the plurality of isolating circuit breakers and receiving respective instantaneous value signals transmitted by the other circuit breakers;

(iii) summing the instantaneous value signals from the sensors in each circuit breaker in substantially real time; and (iv) controlling operation of individual actuators of respective circuit interrupters in accordance with the sum of said instantaneous value signals.

BRIEF DESCRIPTION OF THE DRAWINGS

To assist in understanding the invention preferred embodiments will now be described with reference to the following figures in which.

DETAILED DESCRIPTION OF THE PREFERRED EMBODIMENTS

Figure 1:
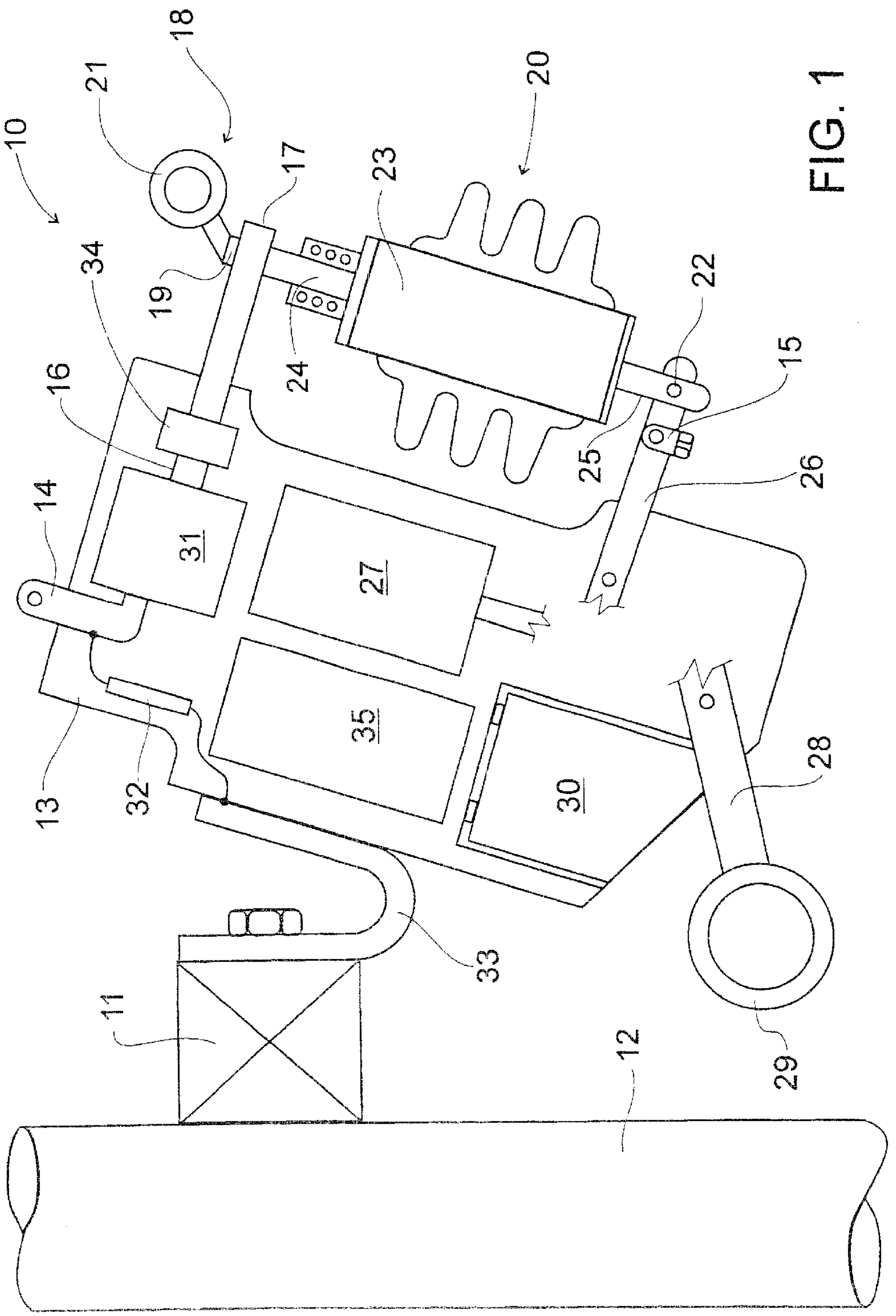
FIG. 1 is a diagrammatic side elevational view of an isolating circuit breaker of a first embodiment in a closed position.

In the drawings, like reference numerals refer to like parts. Referring to FIG. 1, there is an isolating circuit breaker 10 of a first embodiment shown mounted on the cross arm 11 of a utility pole 12. The isolating circuit breaker has a mounting structure in the form of an insulating housing 13. The insulating housing is constructed of plastics, suitably being moulded from an epoxy resin. A first line terminal 14 is provided on the top of the housing for connection with a supply conductor of a electrical distribution line (not shown), whilst a second line terminal 15 is provided for connection with a load conductor of the distribution line. The physical arrangement of the housing 13 and terminals 14 and 15 in the embodiment is such that the isolating switch may be conveniently retrofitted to the pole 12 in place of a conventional dropout fuse and fuse holder.

Figure 2:
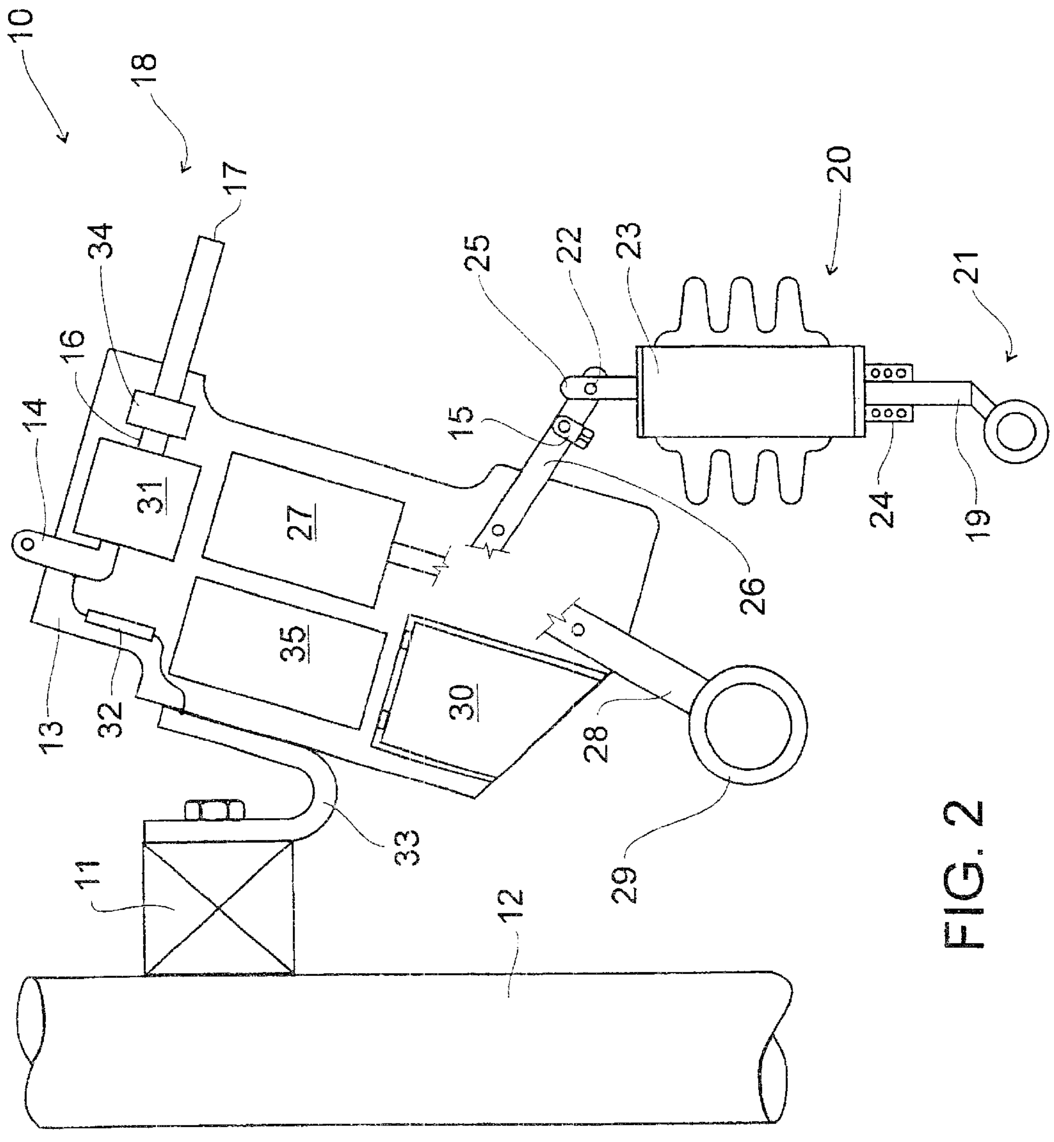
FIG. 2 is a diagrammatic side elevational view of an isolating circuit breaker of the first embodiment in an open position.

A first conductor 16 extends from the first line terminal 14 through the insulating housing 13 and protrudes from a front portion of the housing. The front end of conductor 16 carries a first isolating contact 17 of an isolating switch 18. A second isolating contact 19, arranged for engagement with the first contact 17 (as shown), is carried adjacent the free end of a pivotally mounted link member 20. A ring 21 is provided on the end of the link 20 for hooking with a linesman's "hook stick", such that the isolating switch may be manually operated as required. The isolating switch is depicted in the "open" position in FIG. 2, wherein the link member 20 depends from the pivot 22.

The link member 20 carries a circuit interrupter suitable for breaking load current, formed by a vacuum interrupter 23 in the embodiment. The vacuum interrupter may be of a conventional type including contacts in a sealed evacuated container. A series of sheds of elastomeric material are provided on the exterior of the sealed container. The vacuum interrupter 23 has a fixed terminal associated with an internal fixed contact (not shown) and a movable terminal, at an opposite end of the container, associated with an internal movable contact (not shown). The fixed terminal 24 of the interrupter is coupled to the first isolating contact 17, whilst the movable terminal 25 on the opposite end of the vacuum interrupter is pivotally coupled 22 to an operating arm 26. The movable terminal 25 of the vacuum interrupter 23 is electrically coupled to the second line terminal 15.

The operating arm 26 protrudes from the insulating housing 13 and is arranged to open and close the vacuum interrupter 23. The operating arm 26 is also constructed of an insulating material, such as glass filled epoxy resin. The second line terminal 15 mounted on the operating arm 26 includes a rotating joint in the present embodiment to accommodate movement during operation of the vacuum interrupter 23. Actuation of the operating arm may be effected by a solenoid 27 located in the housing 13 and mechanically linked to the operating arm 26. Alternatively, the operating arm may be manually operated by a lever 29 which protrudes from a lower portion of the housing in the embodiment. The lever includes a ring 29 on its free end which may be hooked by a hookstick. It will be appreciated from FIG. 2, that the lever 29 also indicates the position of the vacuum interrupter contacts to a linesman.

The operation of the solenoid 27, a low power magnetic latching type in the embodiment, is controlled by a control module 30 also located in the housing 13. The control module 30 is disposed in a separate cartridge to facilitate convenient removal from the housing when desired. The isolating circuit breaker 10 further includes a sensor arrangement for monitoring electrical conditions in a distribution line coupled to the first and second line terminals 14, 15. The sensor arrangement of the embodiment comprises a current transformer 31 associated with conductor 16, and a resistive voltage divider 32 coupled between the first line terminal 14 and a mounting bracket 33 which is electrically coupled to ground potential. Accordingly, both the instantaneous current and voltage of the distribution line may be monitored by the control module 30.

A further solenoid 34 is also provided for ejecting the second terminal 19 of the isolating switch 18 from the first terminal 17. This ejection occurs subsequent to the control module opening the vacuum interrupter to a "lock-out" condition, that is the vacuum interrupter will no longer be re-closed automatically. This typically occurs after the vacuum interrupter has interrupted load current on two immediately previous occasions, generally caused by a fault condition which is not able to be cleared. Upon ejection, the link 20 carrying the vacuum interrupter 23 rotates to the position shown in FIG. 2. This arrangement mimics the operation of a dropout fuse when the fuse blows, clearly indicating the lock-out condition, providing a visible point of isolation and requiring manual intervention to re-set the isolating circuit breaker.

Power is supplied to the control module 30 and a capacitor arrangement 35 for driving the solenoids 27, 34 from the current transformer 31. In an alternative arrangement, the voltage divider 32 may be employed to supply the control module 30 separately. The capacitor arrangement for the actuator solenoid 27 is maintained fully charged, with enough energy to effect the maximum number of open ("trip") and close operations of the vacuum interrupter to lockout. The power supply may further include a rectifier and voltage regulator (not shown). The sensor arrangement, the electronics contained in the control module 30 and the solenoids all float at line voltage, thereby reducing the requirement for voltage isolation. The interior of the insulating housing 13 is filled with a hydrophobic material, such as silicone grease to prevent ingress of moisture.

The cartridge of the control module 30 may not be removed from the housing 13 unless the vacuum interrupter is open, whereby the manual operating lever 28 swings away to allow the cartridge to be unplugged. When removed the cartridge may be manipulated to adjust operating parameters of the isolating switch, such as protection settings and time delays. The cartridge may be manipulated directly, such as with a screw-driver to adjust potentiometers or, more desirably, can interface with a portable computer or hand-held programming device as in the present embodiment. The control module of the embodiment includes a micro-controller and associated memory, and data logs of electrical conditions on the distribution line may be downloaded in addition to adjustment of protection settings for the isolating circuit breaker. The control module may also be removed for repair or electronics upgrade.

Figure 3:
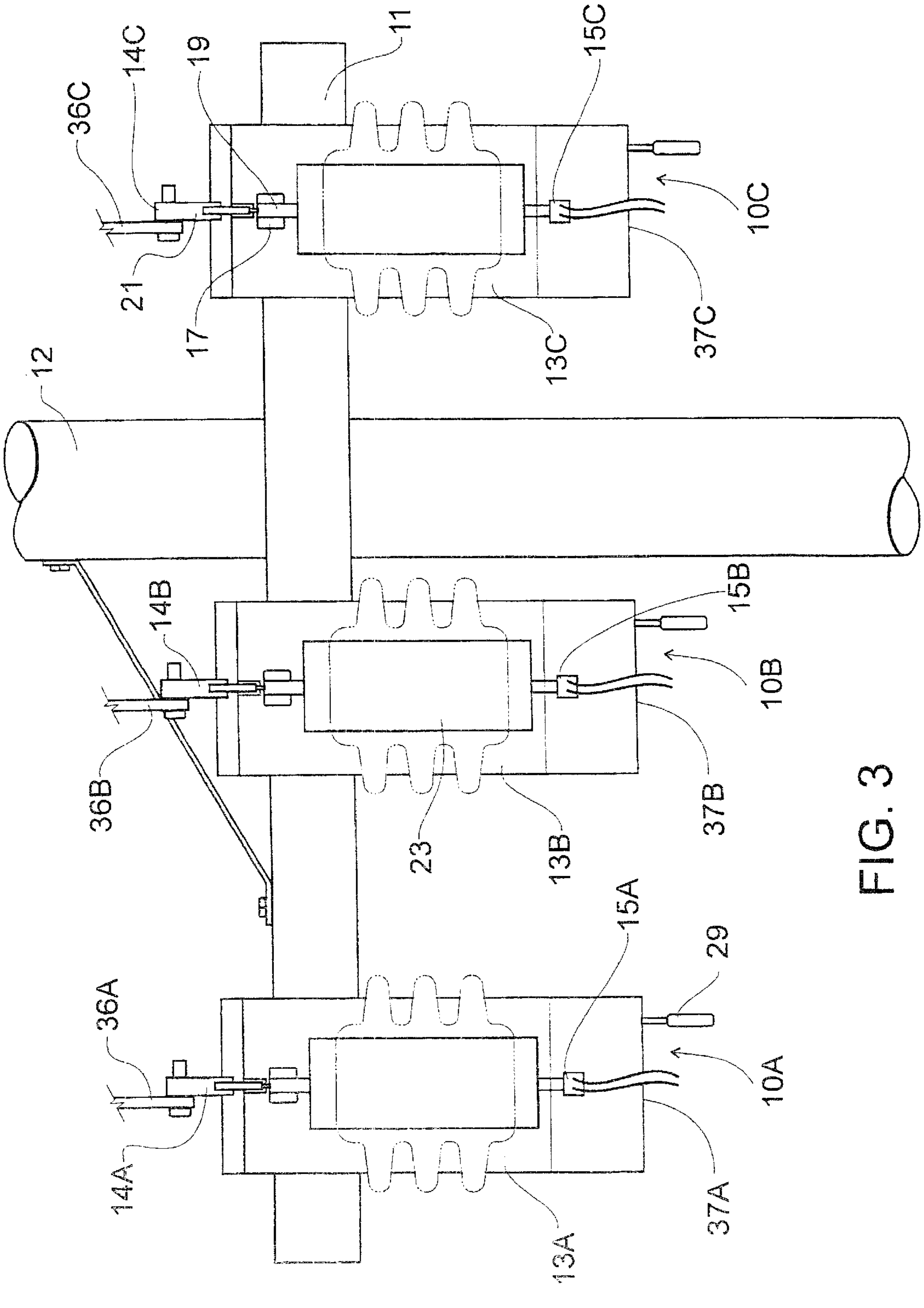
FIG. 3 is a diagrammatic top plan view of an array of isolating circuit breakers of a second embodiment connected in a multi-phase electrical distribution network.

A second embodiment of the invention is illustrated in FIG. 3 of the drawings, wherein a series of three isolating circuit breakers 10A, 10B and 10C are provided for respective phase lines A, B and C of a multi-phase distribution circuit. Supply conductors 36A, 36B and 36B are connected to respective first line terminals 14A, 14B and 14C; whilst load conductors 37A, 37B and 37C are connected to respective second line terminals 15A, 15B and 15C.

The three isolating circuit breakers 10A, 10B, 10C of the second embodiment are similar to those described above in relation to the first embodiment, except that a communications transceiver is incorporated into each housing. Signals indicative of electrical conditions in one phase, for example phase A, are transmitted via the communications interface to control modules located in the remaining phases, for example phases B and C. This allows the control modules to process line condition signals from each phase in substantially real time to control operation of individual actuators.

The communications transceiver uses radio as the communications medium, whereby the signals produced by the sensor are indicative of the instantaneous value of the current and/or voltage on each phase line. Each of the control modules sums the instantaneous values whereby a residual vector sum is indicative of a fault condition in the multi-phase circuit.

Alternative communications arrangements may be optical, involving optical fibres, or utilise an acoustic medium such as ultrasonic band frequencies.

Figure 4:
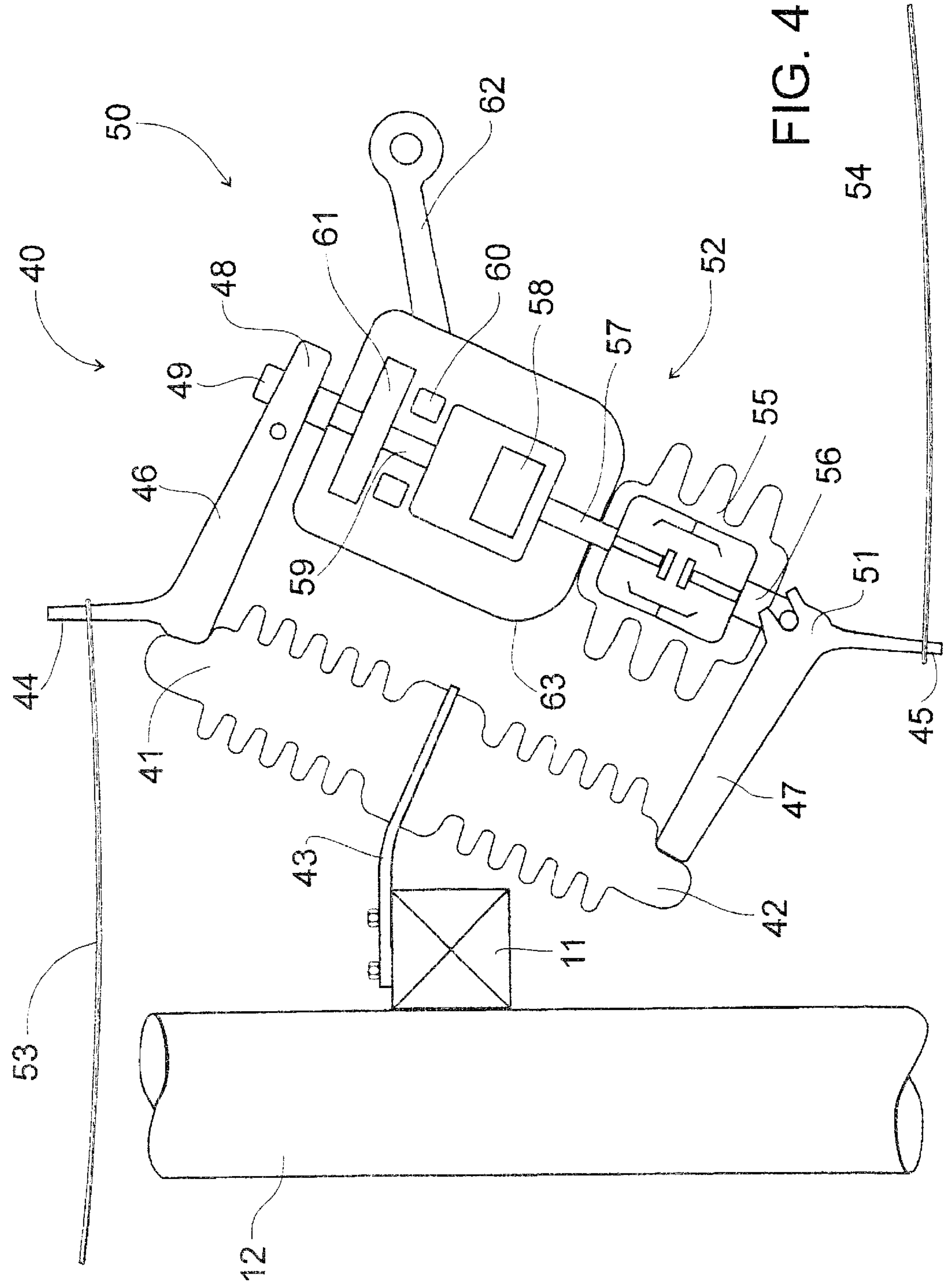
FIG. 4 is a diagrammatic side elevational view of an isolating circuit breaker of a third embodiment in a closed position.

FIG. 4 is a diagrammatic view of an isolating circuit breaker 40 of a third embodiment. The mounting assembly for the circuit breaker includes insulating members 41, 42 having upper and lower support arms which incorporate respective line terminals 44 and 45. The insulating members are supported by a bracket 43 which is mounted on the cross-arm 11 of a utility pole 12. The upper support arm 46 is a conductor and carries a first isolating contact 48 of an isolating switch 50, whilst the second isolating contact 49 is formed on an upper free end of a pivotally mounted link member 52. The pivot for the link member 52 is provided on an end 51 of the lower support arm 47.

Figure 5:
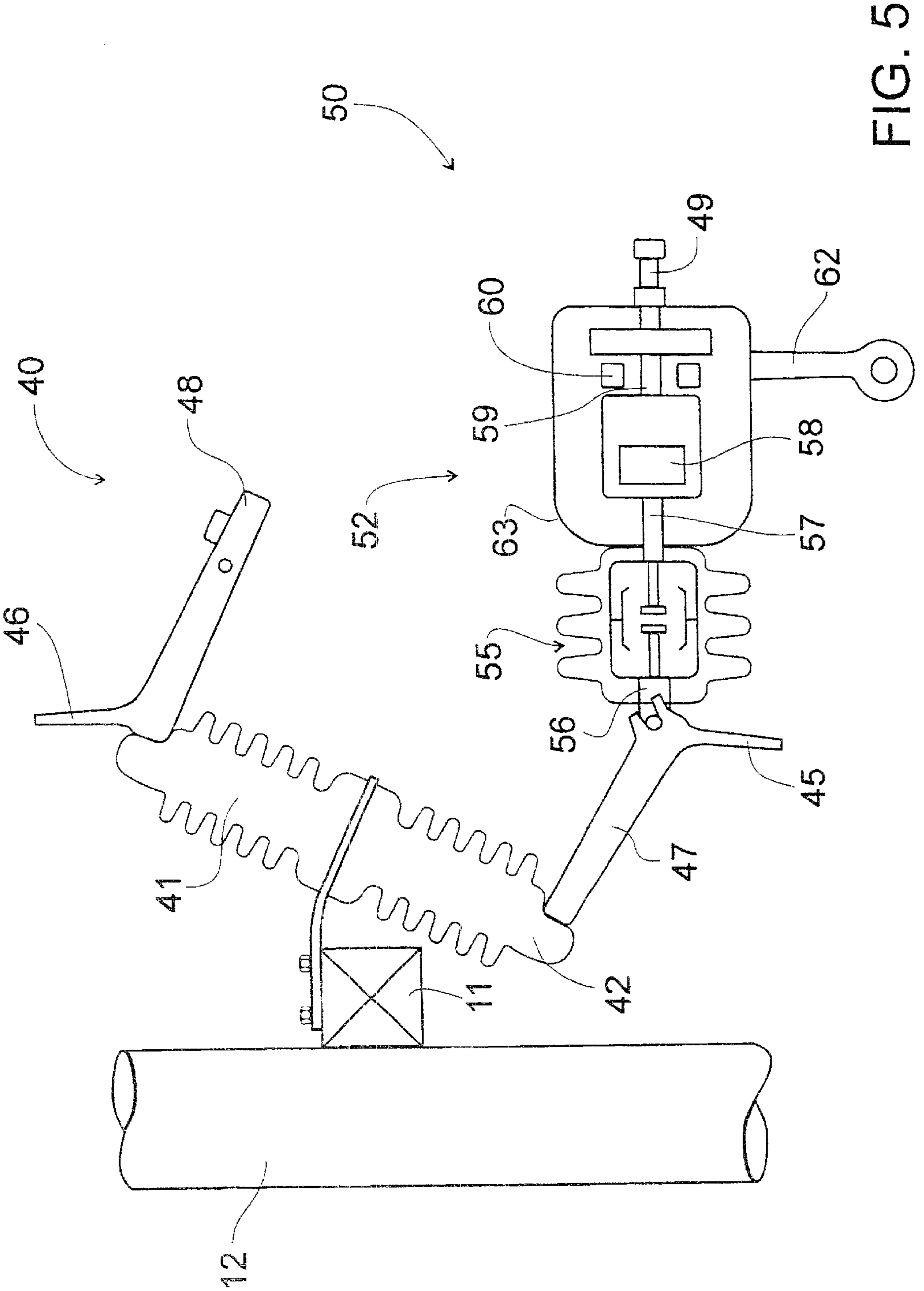
FIG. 5 is a diagrammatic side elevational view of an isolating circuit breaker of the third embodiment in an open position.

FIG. 5 shows the link 52 in a pivoted position whereby the isolating switch 50 is in an open position, providing visible air gap isolation between first isolating contact 48 and second isolating contact 49. In the embodiment, a supply conductor 53 of a distribution line may be coupled to the first line terminal, whilst a load conductor 54 may be coupled the second line terminal. As with the previous embodiments, the link 52 also includes a circuit interrupter disposed both in series with the isolating contacts 49, 50 and intermediate the supply conductor 53 and load conductor 54.

The circuit interrupter is a component of link 52 and takes the form of a vacuum interrupter 55 in the present embodiment. The fixed terminal 56 of the vacuum interrupter is pivotally coupled to the lower conductive support arm 47 for the link. The movable terminal 57 of the vacuum interrupter is mechanically coupled to an actuator, that here takes the form of a magnetic actuator 58. The fixed terminal 56 of the vacuum interrupter is electrically coupled to a conductor 59 which carries the second isolating contact 49 of the isolating switch 50.

The conductor 58 is associated with a sensor arrangement for producing signals in response to electrical conditions in the distribution line. The sensor arrangement includes a current transformer 60 for detecting current flowing therein, and current flow signals produced by the current transformer 60 are provided to an electronic controller 61. The electronic controller 61 suitably includes an integrated circuit device, in the form of a microprocessor and a memory for storing both operating programs and related data. The data includes protection settings relating to operation of the isolating circuit breaker 40, in particular parameters for an automatic re-closing sequence for the vacuum interrupter 55.

In addition, the vacuum interrupter may be manually tripped by way of an operating lever 62 which protrudes from a housing containing the electronic controller 61, the current transformer 60 and the magnetic actuator 58 to which the operating lever is mechanically coupled. When the vacuum interrupter 55 is opened or "tripped", the operating lever 62 can then be used to open the isolating switch 50 to a position as shown in FIG. 5. This provides a visual break in the distribution line, in accordance with safety requirements for work by linesmen.

In the third embodiment, the housing containing the magnetic actuator 58, the current transformer 60, associated conductor 59 and electronic controller 61 is incorporated into the link 52. A mechanism (not shown) mechanically links the movable terminal 57 of the vacuum interrupter 55 to the manual operating lever 62. In a first arc of operation the operating lever can open the vacuum interrupter 55. In a second arc of operation, the operating lever can open the first and second contacts 48, 49 of the isolating switch 50.

The housing 63 may be constructed of a metallic material, such as aluminium. Bulky and sometimes unreliable insulation arrangements are not required for the housing of the embodiment since it is suitably arranged to float at the line potential of the distribution circuit when in operation. Supply for the electronic controller 61 is provided by the current transformer 60, although other arrangement may also include a battery back-up arrangement for added reliability of operation.

Figure 6:
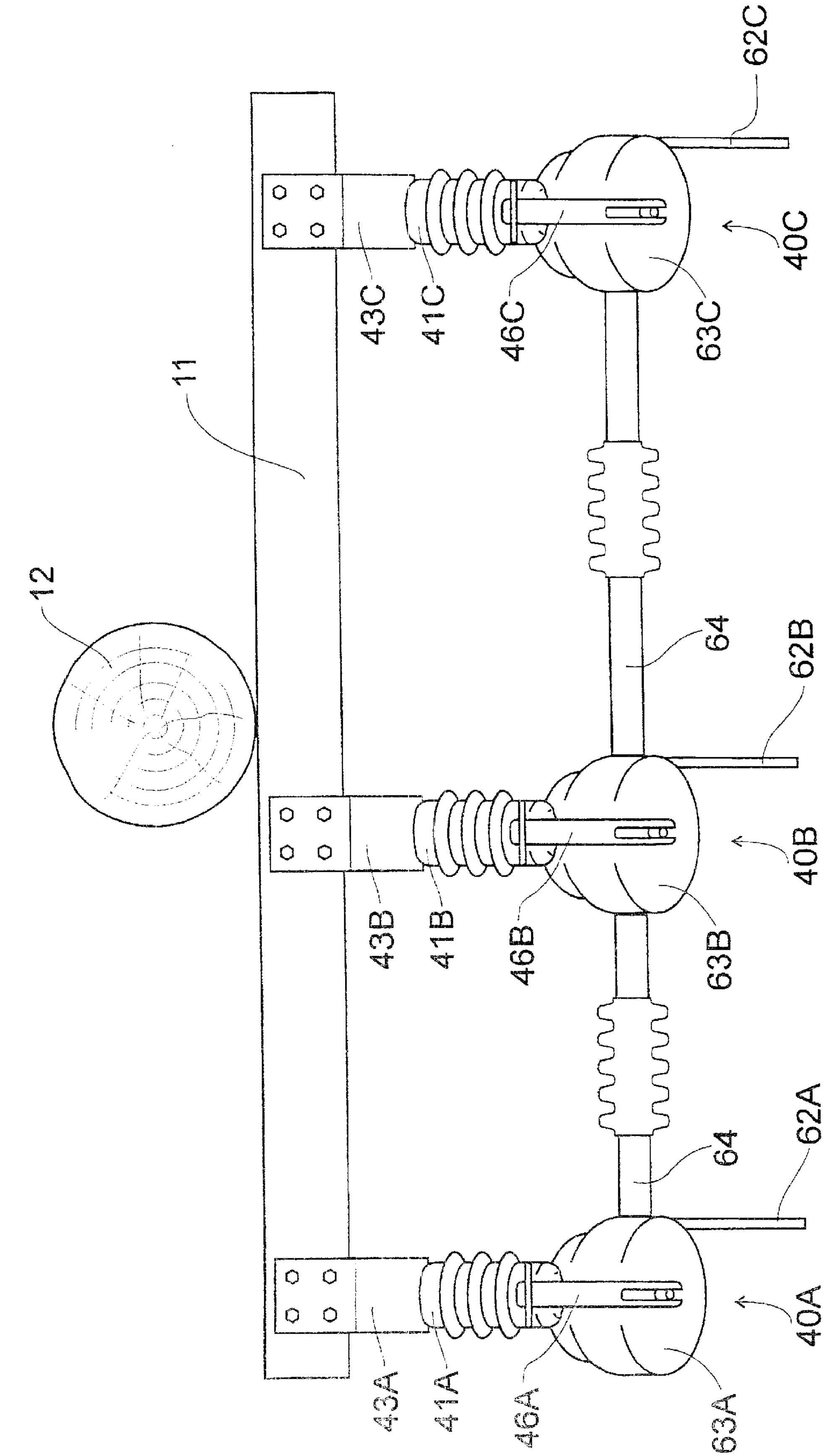
FIG. 6 is a diagrammatic top plan view of an array of isolating circuit breakers of a fourth embodiment connected in a multi-phase electrical distribution network.

FIG. 6 illustrates a group of three isolating circuit breakers 40A, 40B, 40C of a fourth embodiment arranged in array in relation to a multi-phase distribution circuit. The isolating circuit breakers of the fourth embodiment are similar to those described above in relation to the third embodiment, except they further include a mechanical coupling arrangement for their respective circuit interrupter actuating mechanisms. In particular, the coupling arrangement allows the mechanisms to be linked by insulating coupling rods 64 such as depicted in FIG. 6.

In the present embodiment, the coupling rods 64 are coupled between the actuating mechanisms in close vicinity to the manual operating levers 62A, 62B and 62C. Accordingly, automatic operation of a circuit interrupter initiated by at least one of the electronic controllers may be arranged to cause all three phases to open. Similarly, a manual operation by a linesman hooking one of the operating levers 62 may be arranged to trip all three circuit interrupters, if desired. It will be appreciated that it is desirable, for safety reasons, to ensure that the circuit interrupters are closed only after the isolating switches have been closed.

Figure 7:
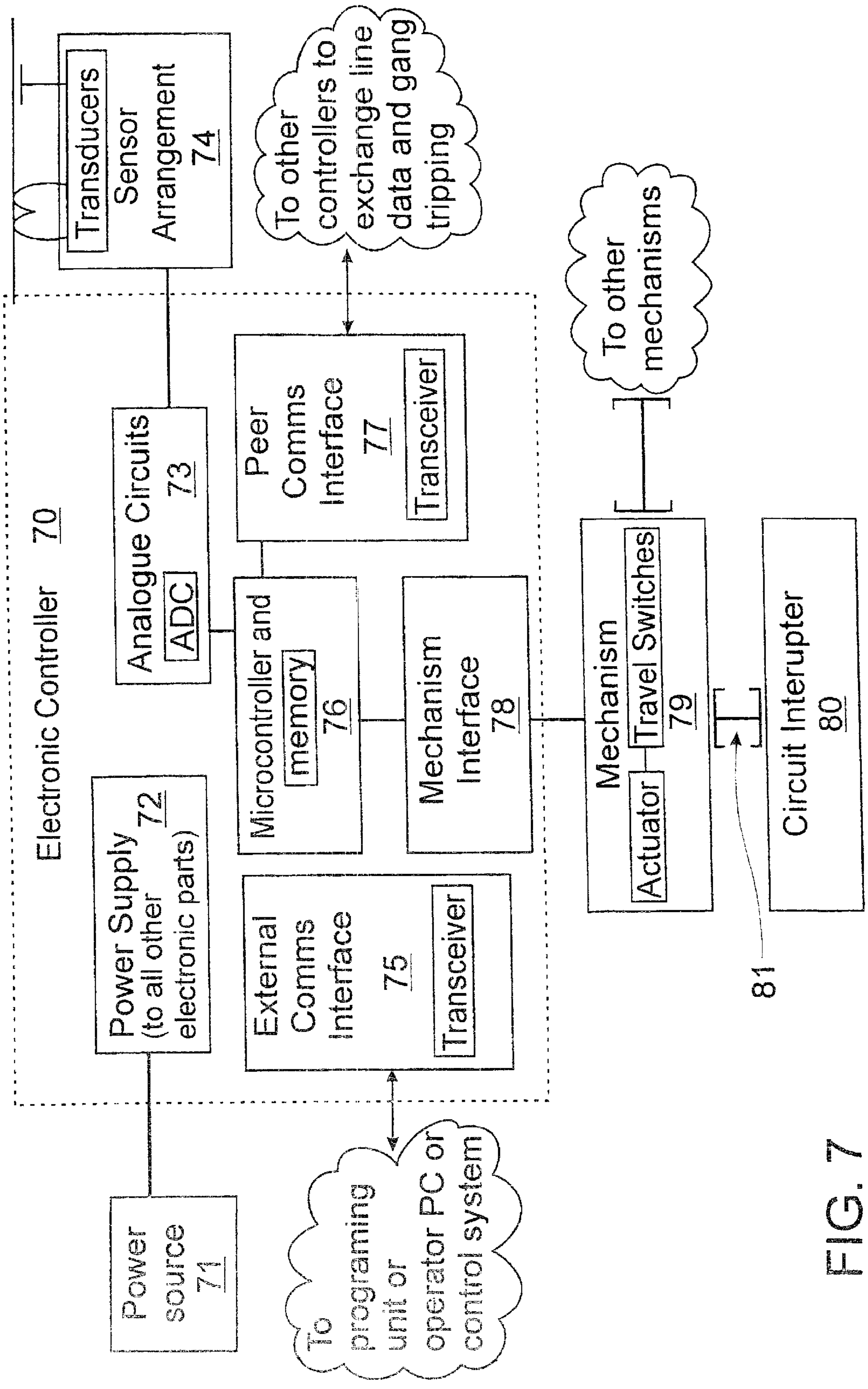
FIG. 7 is block diagram of a preferred electro-mechanical arrangement for isolating circuit breakers of the embodiments.

FIG. 7 is a block diagram illustrating a preferred electro-mechanical arrangement suitable for isolating circuit breaker of the above embodiments. An electronic controller 70 receives supply from a power source 71, which may be derived from the distribution line and/or a battery or similar storage cell, via a power supply circuit 72. The power supply circuit 72 conditions power from the power source 71 for all the electronic circuitry in the controller 70.

The sensor arrangement 74 includes transducers, such as current and voltage transformers, for monitoring the distribution line. The transducers provide electrical signals to respective analogue circuits 73, which signals are indicative of electrical conditions in the distribution line. The electrical signals from the transducers are conditioned an converted into digital form, using an analogue to digital converter (ADC) for example, and passed to the microcontroller 76.

The micro-controller 76, which includes a microprocessor and associated memory in the embodiment, processes the digital signals in accordance with protection settings contained in the memory. Other embodiments may utilise gate arrays or an applications specific integrated circuit in the controller. The processing may also take account of other digital data received from other electronic controllers via the peer communications interface 77. This data typically relates to controllers associated with other phases in a multi-phase distribution circuit. The interface includes a communications transceiver which may utilise radio, fibre optic, ultrasonic or other convenient communications medium.

The micro-controller 76 also controls an actuating mechanism 79 via an actuating mechanism interface 78. Signals to trigger operation of actuators for driving the circuit interrupter 80 and (if required) isolating switch are supplied via the interface 78. Signals from position indicating switches are also received from the actuating mechanism 79 via the interface 78.

A first mechanical linkage is provided to drive the circuit interrupter 80, whilst a second linkage may be provided to mechanically gang circuit interrupters in other phases, as required. In one arrangement, the second linkage is operated only when a persistent fault condition is not cleared by an automatic re-closing sequence. Under these conditions all interrupters are operated substantially simultaneously to a lock-out condition.

An external communications interface 75 may also be provided to facilitate remote or near field operations or programming tasks, as required. These tasks include varying the protection settings in the memory or upgrading or renewing processing software. Remote operations may include selective tripping from a remote control centre to facilitate maintenance of associated distribution system equipment.

It will be appreciated that the first embodiment of the invention may be modified to include a mechanical, rather than electronic, ganging arrangement as required. Similarly, the electronic ganging arrangement could be omitted from the third embodiment if desired for reasons of cost savings.

The isolating circuit breaker of the invention can suitably be retrofitted in place of dropout fuses and configured to provide a re-closing function at a significantly lower cost than installation of a separate recloser. The capability of manual operation of the isolating switch is also preserved. When used in a three phase configuration, the added protection provided by detection of voltage or current imbalances between phases, such as caused by earth faults, is available.

Throughout this specification, unless the context requires otherwise, the word "comprise", and variations such as "comprises" or "comprising", will be understood to imply the inclusion of a stated integer or group of integers or steps but not the exclusion of any other integer or group of integers or steps.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. An isolating circuit breaker for pole mounting in relation to a electrical distribution line, said isolating circuit breaker including:

(a) an isolating switch with a pivoting link, said isolating switch having respective terminals for electrical coupling to load and supply conductors of the electrical distribution line;

(b) a circuit interrupter disposed in series with the isolating switch, intermediate said load and supply conductors;

(c) an actuator arranged for selectively opening and closing the circuit interrupter;

(d) an electronic controller controlling operation of the circuit breaker in response to electrical conditions in the distribution line; and (e) said isolating switch, circuit interrupter, actuator and electronic controller arranged together on a mounting structure adapted for pole mounting.

2. The isolating circuit breaker of claim 1 wherein the circuit interrupter is incorporated in the pivoting link of the isolating switch.

3. The isolating circuit breaker of claim 1 wherein the electronic controller is incorporated in the mounting structure.

4. The isolating circuit breaker of claim 1 wherein the electronic controller is incorporated in the pivoting link of the isolating switch.

5. The isolating circuit breaker of claim 1 wherein the actuator and electronic controller are not isolated from the distribution line and thereby float at line potential.

6. The isolating circuit breaker of claim 1 wherein the actuator and electronic controller are isolated from the distribution line.

7. The isolating circuit breaker of claim 1 wherein the electronic controller derives power supply from the distribution line.

8. The isolating circuit breaker of claim 1 further including a sensor arrangment coupled to the electronic controller, the sensor arrangement arranged for producing signals in response to the electrical conditions in the distribution line.

9. The isolating circuit breaker of claim 8 wherein the sensor arrangement is carried by the mounting structure.

10. The isolating circuit breaker of claim 8 wherein the sensor arrangement is incorporated in the pivoting link.

11. The isolating circuit breaker of claim 1 wherein the electronic controller derives power supply from a separate transformer or from a capacitor coupled to the distribution line.

12. The isolating circuit breaker of claim 1 wherein the electronic controller derives power supply from a primary or secondary storage cell.

13. The isolating circuit breaker of claim 8 wherein the sensor arrangement includes a current transformer for measuring current in the distribution line.

14. The isolating circuit breaker of claim 8 wherein sensor arrangement includes a wound voltage transformer for measuring voltage in the distribution line.

15. The isolating circuit breaker of claim 8 wherein the sensor arrangement includes a resistive voltage divider or a capacitive voltage divider or measuring voltage in the distribution line.

16. The isolating circuit breaker of claim 1 wherein the electronic controller includes a integrated circuit device with a memory for storing data.

17. The isolating circuit breaker of claim 16 wherein the data includes protection settings relating to operation of the isolating circuit breaker.

18. The isolating circuit breaker of claim 17 wherein the protection settings include parameters for an automatic re-closing sequence of the circuit interrupter.

19. The isolating circuit breaker of claim 16 wherein the memory is also arranged to store historical data relating to the electrical conditions in said distribution line.

20. The isolating circuit breaker of claim 1 further including at least one communications transceiver coupled to the electronic controller.

21. The isolating circuit breaker of claim 20 wherein the communications transceiver facilitates communications with other isolating circuit breakers for providing earth current and/or earth fault protection of a multi-phase distribution circuit.

22. The isolating circuit breaker of claim 21 wherein the communications transceiver facilitates communications with a remote device for uploading protection settings or downloading of historical data.

23. The isolating circuit breaker of claim 22 wherein the communications medium utilised by said at least one communications transceiver is radio.

24. The isolating circuit breaker of claim 20 wherein the communications medium utilised by said at least one communications transceiver is optical.

25. The isolating circuit breaker of claim 20 wherein the communications medium utilised by said at least one communications transceiver is acoustic.

26. The isolating circuit breaker of claim 1 wherein the isolating switch is an air gap isolator.

27. The isolating circuit breaker of claim 1 wherein the circuit interrupter is a vacuum interrupter.

28. A circuit protection arrangement for a multi-phase circuit of an electrical distribution network, said arrangement comprising:

(a) a plurality of isolating circuit breakers for connection in respective phase lines of the multi-phase circuit, wherein each isolating circuit breaker includes:
  (i) an isolating switch with a pivoting link, said isolating switch having respective terminals for electrical coupling to load and supply conductors of a phase line;
  (ii) a circuit interrupter disposed in series with the isolating switch, intermediate said load and supply conductors;
  (iii) an actuator arranged for selectively opening and closing the circuit interrupter,
  (iv) a sensor arrangement producing signals in response to electrical conditions in a respective phase line;
  (v) a communications transceiver for transmitting said signals to others of the plurality of isolating circuit breakers and for receiving respective phase line condition signals transmitted by other isolating circuit breakers of said plurality;
  (vi) an electronic controller receiving signals from both the sensor arrangement and from the other isolating circuit breakers via the communications transceiver; and
  (vii) said isolating switch, circuit interrupter, actuator and electronic controller arranged together on a mounting structure adapted for pole mounting;

(b) whereby the electronic controllers process the line condition signals from each phase in substantially real time to control operation of individual actuators of respective circuit interrupters.

29. The circuit protection arrangement of claim 28 wherein the electronic controllers, upon processing signals indicative of a predetermined persistent fault condition in the multi-phase circuit, operate the individual actuators substantially simultaneously.

30. A circuit protection arrangement for a multi-phase circuit of an electrical distribution network, said arrangement including:

(a) a plurality of isolating circuit breakers for connection in respective phase lines of the multi-phase circuit, wherein each isolating circuit breaker comprises:
  (i) an isolating switch with a pivoting link, said isolating switch having respective terminals for electrical coupling to load and supply conductors of a phase line;
  (ii) a circuit interrupter disposed in series with the isolating switch, intermediate said load and supply conductors;
  (iii) a sensor arrangement producing signals in response to electrical conditions in a respective phase line;
  (iv) an electronic controller receiving signals from the sensor arrangement;
  (v) an actuator arranged for selectively opening and closing the circuit interrupter in response control signals from the electronic controller; and
  (vi) said isolating switch, circuit interrupter, actuator and electronic controller arranged together on a mounting structure adapted for pole mounting;

(b) the actuators of respective isolating circuit breakers being mechanically coupled such that all circuit interrupters of the plurality may be opened substantially simultaneously in response to a predetermined fault condition in at least one of said phase lines.

31. A circuit protection arrangement as claimed in claim 30 wherein the mechanical coupling is arranged such that all circuit interrupters are opened simultaneously only as a result of a persistent fault condition.

32. A circuit protection arrangement as claimed in claim 30 wherein the operating mechanisms are mechanically coupled by insulating coupling rods extending between respective actuators.

33. A method for protecting a multi-phase circuit of an electrical distribution network, said network comprising:

(a) a plurality of isolating circuit breakers for connection in respective phase lines of the multi-phase circuit, wherein each isolating circuit breaker includes:
  (i) an isolating switch with a pivoting link, said isolating switch having respective terminals for electrical coupling to load and supply conductors of a phase line
  (ii) a circuit interrupter disposed in series with the isolating switch intermediate said load and supply conductors;
  (iii) a sensor arrangement producing signals in response to electrical conditions in the phase line;
  (iv) a communications transceiver associated with the sensor arrangement; and
  (v) the isolating switch, circuit interrupter and sensor arrangement carried by a mounting structure adapted for pole mounting;

(b) wherein the method includes the steps of:
  (i) sensing the instantaneous values of an electrical parameter of a phase line at a respective isolating circuit breaker;
  (ii) transmitting the instantaneous value signals produced by the sensor arrangement to others of the plurality of isolating circuit breakers and receiving respective instantaneous value signals transmitted by the other circuit breakers;
  (iii) summing the instantaneous value signals from the sensors in each circuit breaker in substantially real time; and
  (iv) controlling operation of individual actuators of respective circuit interrupters in accordance with the sum of said instantaneous value signals.

* * * * *